INVENTOR
JOHAN SCHUTTEN

United States Patent Office 2,904,749
Patented Sept. 15, 1959

2,904,749

DEVICE FOR DETERMINING VERY LOW GAS PRESSURES

Johan Schutten, Amsterdam, Netherlands, assignor to North American Philips Company Inc., New York, N.Y., a corporation of Delaware Application April 11, 1957, Serial No. 652,289

Claims priority, application Netherlands April 26, 1956

5 Claims. (Cl. 324—33)

The present invention relates to a device for determining very low gas pressures. More particularly, the invention relates to a device for determining very low gas pressures, in which in the space in which the gas pressure is determined the gas molecules are ionized by means of electrons. The electrons are emitted by a cathode and are accelerated under the action of an electrode which is positive with respect to the cathode. Provision is made of a collector electrode, which is negative with respect to the cathode, and which collects the ions. In the device of the invention, the ratio between the ion flow to the collector electrode and the emission current is measured.

In such an ionization manometer the emitted electrons are accelerated to a few hundred volts. The measuring space communicates with the system in which the low pressure prevails. There is a certain probability which varies with the acceleration voltage $V$ and with the nature of the gas, that collisions between the emitted electrons and the gas molecules result in the formation of positive ions. The number of ions formed is proportional to the number of molecules.

Consequently, with a constant value of the acceleration voltage $V$ and a given electron current there is a linear relationship between the pressure and the positive ion flow. This applies to low pressures of for example $P < 10^{-3}$ mm. Hg.

The sensitivity of a manometer of this kind can be defined as follows $$S = I_i / P \cdot I_e$$

wherein $P$ designates the pressure, $I_i$ the flow of ions and $I_e$ the electron current.

With a given pressure this sensitivity varies with the form of construction of the electrode system of the tube. The geometry of the tube determines to a certain extent the lower limit of the pressure to be measured.

With a particular embodiment of the ionization manometer of the kind described above the anode is formed in the shape of a cylindrical grid, in the axis of which is arranged the collector electrode, which is constituted by a wire of very small diameter. Such a device permits the measuring of pressures down to about $10^{-10}$ mm. Hg.

In a known device it is necessary to keep the emitted current constant within very narrow limits, so that the arrangement as a whole is often rather complicated.

The invention has for its object to provide a device which does not require such a stabilization.

The invention consists in that a device of the kind described above is provided with two capacitors, of which one is charged by the ion flow and the other is discharged by the electron current and in that, as soon as the voltage at either of the capacitors has varied by a given amount, the initial state of charge is restored. The gas pressure can then be derived from the measured voltage variation at the other capacitor during the total charging or discharging time, respectively.

The first capacitor is preferably discharged by the electron current until its voltage has dropped to a particular value, after which the initial state of charge of the two capacitors is restored. In this case, the ratio between the ion flow and the electron current is measured directly. If the second capacitor were charged to a particular voltage and the voltage variation measured at the first capacitor during the charging time of the second, the inverse ratio would be measured and the indication of the dial would be inversely proportional to the pressure. This may be less desirable.

The charge restoration is obtained by means of a trigger circuit, which responds as soon as the voltage at the first or the second capacitor reaches the said particular value.

The invention is based on the recognition of the fact that within certain limits the electron current and the ion flow are substantially independent of the anode voltage and the collector voltage.

In order that the invention may be readily carried into effect, it will now be described more fully with reference to the accompanying drawing, in which.

Figure 1:
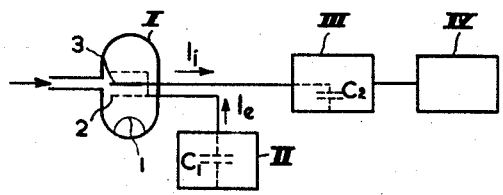
Fig. 1 is a schematic block diagram of an embodiment of the device of the present invention.

Referring to Fig. 1, reference numeral I designates the ionization manometer proper, which is provided with an envelope of, for example, glass, the interior of which communicates through a duct with the system, in which the pressure is to be measured. The manometer is provided with an electron-emitting cathode 1, a grid-shaped anode 2 and a collector electrode 3. To the anode is applied a positive voltage of, for example, 300 volts with respect to the cathode; the collector electrode has, for example, a negative voltage of 150 volts with respect to the cathode. These voltages may have other values. The most favorable values depend to a high extent upon the construction of the tube and upon the circuit arrangement employed.

The ion flow $I_i$, which strikes the collector, charges a capacitor $C_2$, included in the circuit arrangement of unit III, to be described hereinafter, for a certain time, so that a voltage variation is produced at the capacitor, i.e.

$$\Delta V_{c_2} = \frac{1}{C_2} \int_{t_1}^{t_2} I_i dt$$

The time interval $\Delta t = t_2 - t_1$.

Starting from a suitable collector voltage of, for example, −150 volts, the current is substantially constant up to a collector voltage of, for example, −100 volts with high pressures and even to −10 volts with low pressures, so that we can write:

$$\Delta V_{c_2} = \frac{I_i \cdot \Delta t}{C_2}$$

The period chosen for the charging time is determined by the circuit arrangement of the unit II, to be described hereinafter, which includes a capacitor $C_1$. The capacitor $C_1$ is discharged periodically by the electron current. By means of the unit II $\Delta t$ is rendered inversely proportional to the electron current $I_e$ in the following manner.

It is assumed that the capacitor $C_1$ has an initial charge of $Vt_1$ (for example about 150 volts). When the voltage at the capacitor $C_1$ reaches a predetermined value $Vt_2$ ($Vt_2 > 100$ volts) a trigger circuit becomes operative, so that $C_1$ is charged again to the initial value, $C_2$ being at the same time re-discharged to $-150$ volts. The voltages are chosen to be such that the charging current of $C_2$ and the discharging current of $C_1$ are substantially independent of the voltages. We can then write:

$$Vt_1 - Vt_2 = \frac{I_e \cdot \Delta t}{C_1}$$

The difference between the voltages $Vt_1$ and $Vt_2$ is determined by the trigger circuit.

$$Vt_1 - Vt_2 = K_1 = \text{constant}$$

It can be inferred therefrom that the voltage increase at the capacitor $C_2$ is $$\Delta V_{c_2} = \frac{I_i}{I_e} \cdot K_1 \cdot \frac{C_1}{C_2} = S \cdot K_1 \frac{C_1}{C_2} \cdot P$$

Consequently, this value is proportional to the pressure $P$ and can be read from a peak voltage meter.

Figure 2:
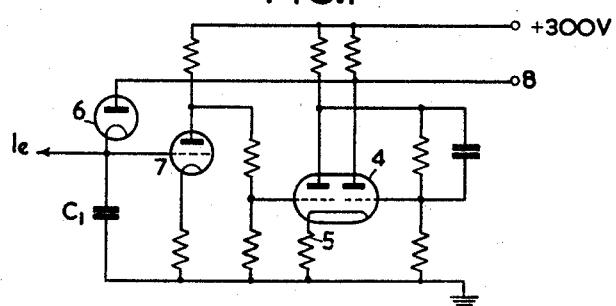
Fig. 2 is a schematic diagram of an embodiment of a circuit arrangement which may be utilized as the unit II of Fig. 1.

Fig. 2 shows an embodiment of a circuit arrangement which may be utilized as the unit II of Fig. 1. The double triode 4 with a number of associated elements constitutes a so-called Schmitt-trigger. In normal conditions the right-hand triode draws current; the current produces across the common cathode resistor 5 such a voltage drop that the left-hand triode is cut off. The anode of the diode 6 is connected to the anode of the right-hand triode of 4 and is hence cut off. Thus the capacitor $C_1$ is discharged by the electron current $I_e$. Then the grid voltage of tube 7 decreases, so that the anode voltage of this tube increases. At the response voltage of the trigger circuit $V_{tr1}$ the right-hand triode is cut off, so that the diode 6 conveys current and the capacitor $C_1$ is charged to a voltage, which is determined by the trigger circuit. The voltage at the grid of tube 7 increases accordingly; the voltage at the anode of this tube decreases until the critical input voltage $V_{tr2}$ of the trigger is reached and the current is taken again by the right-hand triode. The anode voltage of the diode 6 decreases again, so that this tube is cut off and a new cycle can start.

The values of the various resistors included in the electrode supply conductors of the double triode 4 determine the difference between the voltages $V_{tr1}$ and $V_{tr2}$ and hence the so-called hysteresis of the trigger. With a suitable value of the supply voltage (for example $+300$ volts) the said difference is substantially constant.

Figure 3:
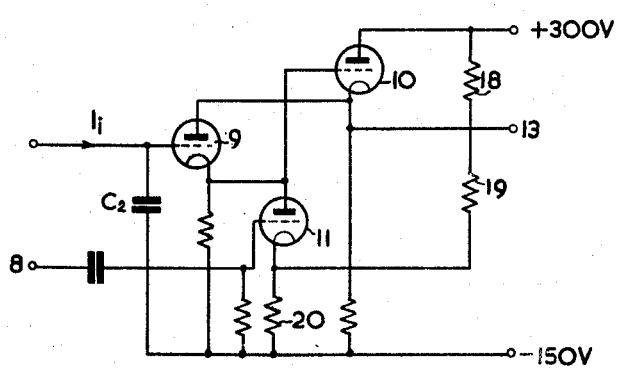
Fig. 3 is a schematic diagram of an embodiment of a circuit arrangement which may be utilized as the unit III of Fig. 1.

Fig. 3 shows an embodiment of a circuit arrangement which may be utilized as the unit III of Fig. 1. The capacitor $C_2$, which is charged by the ion flow, is included between the grid of a tube 9 and a point of constant potential of about $-150$ volts.

The tube 9 is a cathode-follower, the anode of which is connected to the cathode and the cathode of which is connected to the control-grid of a tube 10. The anode voltage of tube 9 thus corresponds with the grid-cathode voltage of tube 10.

With small voltage variations the grid-cathode potential of tube 10 is substantially constant, as well as the anode-cathode voltage of tube 9, so that the working point of this tube is stabilized at a varied grid voltage.

The tube 11, which is connected, in series with a cathode resistor, in parallel with the cathode resistor of tube 9, is normally cut off. However, when the capacitor $C_1$ in the circuit arrangement of the unit II is charged, a positive pulse is applied to the grid of tube 11, so that the cathode resistor of tube 9 is reduced to a very low value. Thus grid current will start to flow, discharging the capacitor $C_2$ until the voltage at the capacitor $C_2$ is reduced to a voltage which is associated with the supply voltage and the resistors 18, 19 and 20.

If a high sensitivity is desired, $C_2$ must be small. The advantage of the arrangement described, in which the discharge takes place across a grid, is then that the insulating resistance of a grid can be made very high and that the influence of parasitic capacities is small.

At the end of the pulse the tube 11 is again cut off, while the grid voltage of tube 9, due to the ion flow, charges the capacitor $C_2$.

Thus at the output terminal 13 a sawtooth voltage is obtained, the slope of which is proportional to the ion flow and to a period $\Delta t$, which is inversely proportional to the electron current. The amplitude of the sawtooth voltage is the product of the slope and the period:

$$V_p = \frac{I_i \cdot \Delta t}{C_2}$$

The measuring range may be chosen at will by providing a different value for $C_1$.

Figure 4:
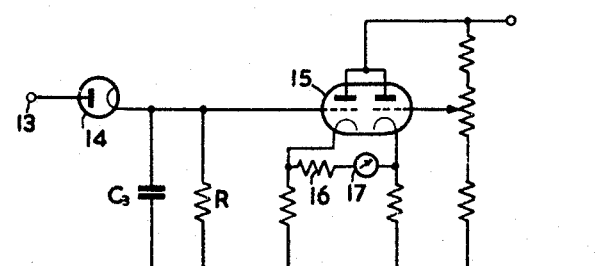
Fig. 4 is a schematic diagram of an embodiment of a circuit arrangement which may be utilized as the unit IV of Fig. 1.

Fig. 4 is an embodiment of a circuit arrangement which may be utilized as the peak voltage meter unit IV of Fig. 1. It consists of a double triode 15, the meter 17 being connected in series with the resistor 16 between the cathodes of the triodes; the anodes of the triodes being connected to each other. The sawtooth voltage produced by the unit III is applied, via the diode 14, to the control-grid of one of the triodes. The capacitor $C_3$, across which is connected a resistor R, is thus charged. The time constant of the elements R and C is chosen to be such that the indication of the meter is substantially constant, even with low pressures and hence with low frequencies of the sawtooth voltage.

While the invention has been described by means of a specific example and in a specific embodiment, I do not wish to be limited thereto, for obvious modifications will occur to those skilled in the art without departing from the spirit and scope of the invention.

What is claimed is:

1. A device for measuring very low gas pressures comprising an ionization manometer having an electron emitting electrode, an accelerator electrode and a collector electrode, means for supplying a gaseous medium to said manometer, means for energizing said electrodes thereby to produce electron flow between said emitter and accelerator electrodes and to ionize said gaseous medium, a first capacitor, means responsive to said electron flow for varying the charge of said first capacitor from a given initial value, a second capacitor, means responsive to the ionization of said gaseous medium for varying the charge of said second capacitor from a given initial value, means responsive to a given variation of the charge of said first capacitor from said initial charge value for terminating the charge variation of said second capacitor and for restoring said capacitors to said given initial charge values respectively, and output circuit means responsive to the charge variation of said second capacitor.

2. A device for measuring very low gas pressures comprising an ionization manometer having an electron emitting electrode, an accelerator electrode and a collector electrode, means for supplying a gaseous medium to said manometer, means for energizing said electrodes thereby to produce electron flow between said emitter and accelerator electrodes and to ionize said gaseous medium, a first capacitor, means responsive to said electron flow for discharging said first capacitor from a given initial value to a given terminal value, a second capacitor, means responsive to the ionization of said gaseous medium for varying the charge of said second capacitor from a given initial value, means responsive to a given variation of the charge of said first capacitor from said initial charge value for terminating the charge variation of said second capacitor and for restoring said capacitors to said given initial charge values respectively, and means for measuring the charge variation of said second capacitor.

3. A device for measuring very low gas pressures comprising an ionization manometer having an electron emitting electrode, an accelerator electrode and a collector electrode, means for supplying a gaseous medium to said manometer, means for energizing said electrodes thereby to produce electron flow between said emitter and accelerator electrodes and to produce ion current flow to said collector electrode, a first capacitor, means responsive to said electron flow for discharging said first capacitor from a given initial value to a given terminal value, a second capacitor, means responsive to the said ion current flow for varying the charge of said second capacitor from a given initial value, a trigger circuit, means comprising said trigger circuit responsive to a given variation of the charge of said first capacitor from said initial charge value for terminating the charge variation of said second capacitor and for restoring said capacitors to said given initial charge values respectively, and means for measuring the charge variation of said second capacitor.

4. A device for measuring very low gas pressures comprising an ionization manometer having an electron emitting electrode, an accelerator electrode and a collector electrode, means for supplying a gaseous medium to said manometer, means for energizing said electrodes thereby to produce electron flow between said emitter and accelerator electrodes and to produce ion current flow to said collector electrode, a first capacitor, means responsive to said electron flow for discharging said first capacitor from a given initial value to a given terminal value, a second capacitor, means responsive to the ion current flow for varying the charge of said second capacitor from a given initial value, a trigger circuit comprising an electron discharge device having a grid, means comprising said trigger circuit responsive to a given variation of the charge of said first capacitor from said initial charge value for terminating the charge variation of said second capacitor and for restoring said capacitors to said given initial charge values respectively, said second capacitor being discharged through said grid, and means for measuring the charge variation of said second capacitor.

5. A device for measuring very low gas pressures comprising an ionization manometer having an electron emitting electrode, an accelerator electrode and a collector electrode, means for supplying a gaseous medium to said manometer, means for energizing said electrodes thereby to produce electron flow between said emitter and accelerator electrodes and to ionize said gaseous medium, a first capacitor, means responsive to said electron flow for discharging said first capacitor from a given initial value to a given terminal value, a second capacitor, means responsive to the ionization of said gaseous medium for varying the charge of said second capacitor from a given initial value, means responsive to a given variation of the charge of said first capacitor from said initial charge value for terminating the charge variation of said second capacitor and for restoring said capacitors to said given initial charge values respectively, a peak voltage meter, and means comprising said peak voltage meter for measuring the voltage difference at the beginning and end of the charge variation of said second capacitor.

References Cited in the file of this patent

UNITED STATES PATENTS

| | | |
|---|---|---|
| 2,784,373 | Lawrence et al. | Mar. 5, 1957 |
| 2,790,949 | Ottinger et al. | Apr. 30, 1957 |
| 2,801,387 | Mitchell et al. | July 30, 1957 |